E. F. BEARD.
CHURN.
No. 172,294.    Patented Jan. 18, 1876.
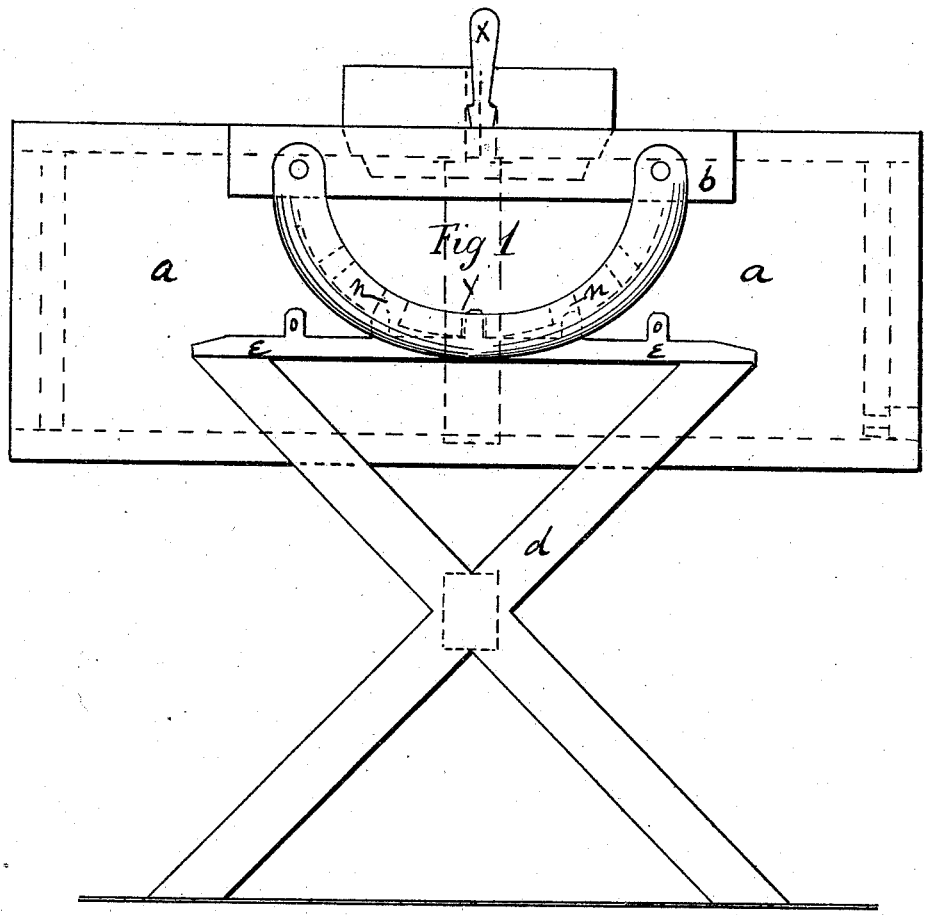
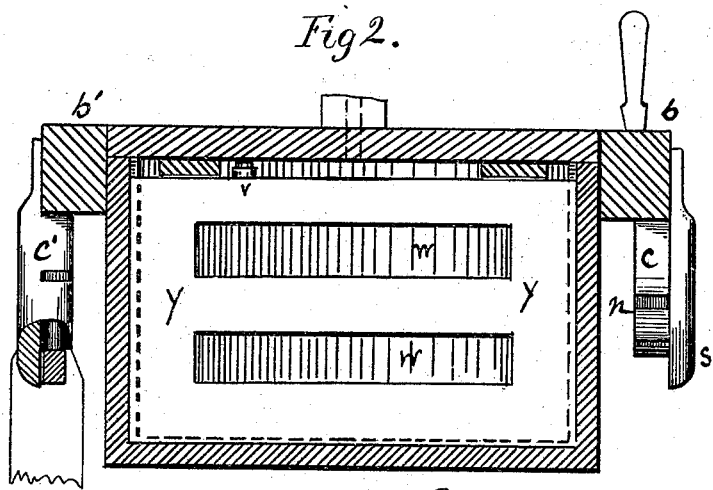
WITNESSES:    Eli. F. Beard    INVENTOR.
              by
              Chas. S. Whitman.
                              ATTORNEY.

UNITED STATES PATENT OFFICE.

ELI F. BEARD, OF REPUBLIC, OHIO.

IMPROVEMENT IN CHURNS.

Specification forming part of Letters Patent No. 172,294, dated January 18, 1876; application filed September 4, 1875.

*To all whom it may concern:*

Be it known that I, ELI F. BEARD, of Republic, county of Seneca and State of Ohio, have invented an Improvement in Churns. The following description, taken in connection with the accompanying plate of drawings, hereinafter referred to, forms a full and exact specification, wherein are set forth the nature and principles of the invention, by which the same may be distinguished from others of a similar class, together with such parts thereof as claimed as new, and desired to be secured by Letters Patent of the United States.

My invention relates to that class of churns to which reciprocating motion is applied; and the nature thereof consists in certain improvements in the construction of the same, hereinafter shown and described.

In the accompanying plate of drawings, in which corresponding parts are designated by the same letters, Figure 1 is a side elevation of a churn having my improvements applied thereto. Fig. 2 is a transverse vertical section.

In said drawings, $a$ is the vessel containing the milk from which butter is to be made. This vessel is provided with two flanges or projections, $b\ b'$, to which are secured the curvilinear rockers $c\ c'$. $d$ designates a stand, upon which are placed the racks or toothed bars $e\ e'$. The said rockers are provided with a series of slots or notches, $n$, for the reception of the upwardly-projecting teeth $o$ of the bars $e\ e'$, and a downwardly-projecting flange, which is accurately fitted upon the sides of the said bars $e$. Reciprocating motion is imparted to the vessel $a$ by means of the handle $x$.

The operation and advantages of the machine will be clearly understood by those skilled in the art without further description. For the purpose of regulating the temperature of the milk a reservoir, $y$, having openings $w$, through which the milk passes when the machine is in motion, is arranged transversely across the center of the vessel $a$. This reservoir is provided with an opening covered by a plug, and through which hot or cold water may be introduced, and is arranged in slots cut for its reception in the sides of the vessel $a$ in such a manner that it may be removed with facility.

Having thus described my invention, I claim and desire to secure by Letters Patent of the United States—

1. The combination of the vessel $a$, flanges $b\ b'$ and $s$, rockers $c\ c'$, provided with notches $n$ and toothed bars $e\ e'$, as and for the purposes described.

2. The reservoir $y$, provided with openings $w$, in combination with the vessel $a$, as and for the purposes described.

In testimony that I claim the foregoing I have hereunto set my hand.

ELI F. BEARD.

Witnesses:
STEPHEN LAPHAM,
JOHN L. COLE.